Patented Mar. 12, 1940

2,193,415

UNITED STATES PATENT OFFICE 2,193,415

PROCESS FOR THE PREPARATION OF CYCLIC-ORGANO-TRITHIOCARBONATES

Willem Coltof, Amsterdam, Netherlands, assignor to Shell Development Company, San Francisco, Calif., a corporation of Delaware No Drawing. Application May 17, 1938, Serial No. 208,490. In Great Britain May 29, 1937

16 Claims. (Cl. 260—327)

The present invention relates to a process for the production of heterocyclic compounds suitable for use as flotation agents. More particularly, the invention relates to a process for the production of cyclic-organo-trithiocarbonates. By cyclic-organo-trithiocarbonates, I means trithiocarbonates in which the two thiol sulfur atoms are members of a heterocyclic ring.

An object of the invention is to provide a process whereby cyclic-organo-trithiocarbonates may be produced in good yields in a more simple manner from relatively inexpensive and available raw materials. Another object is to provide a process whereby new and useful flotation agents may be prepared at a cost not prohibitive to their commercial use.

Trithiocarbonates may be synthesized by several methods. The known methods, however, require costly reagents, are usually involved, and are not generally suited for commercial use. Thus, for example, ethylene trithiocarbonate has been prepared by reacting sodium ethylene dimercaptide with carbon disulfide, by reacting ethylene bromide with sodium trithiocarbonate in absolute alcohol, and by more complicated syntheses. In order to prepare trithiocarbonates from carbon disulfide it has always been considered necessary to react the same with a compound containing the structural grouping

such as, for instance, ethylene mercaptan, dithiocatechol, etc. Reagents having this dithiol structure are difficult to prepare, not readily available, and consequently costly.

I have found, contrary to expectation and the teaching of the art, that, in general, good yields of cyclic-organo-trithiocarbonates may be prepared by reacting carbon disulfide with organic diol compounds, i. e., compounds containing two alcoholic hydroxy groups. I have, furthermore, found that it is not necessary first to prepare the diol compound since any derivative thereof which in the presence of water and an alkali is capable of yielding the diol compound is equally applicable.

As examples of derivatives of diol compounds may be mentioned those compounds in which one or both of the reactive alcoholic hydroxy groups has or have been esterified with an organic or inorganic acid, reacted with an alkali metal, substituted by halogen, connected to form epoxy ring by removal of water, and, in general, replaced by any group or groups which, under the influence of water and alkali, tend to form hydroxy groups.

In view of the better yields obtainable and the better stability of the cyclic trithiocarbonates formed, I prefer to use such compounds as contain the reacting hydroxy or hydrolyzable groups attached to carbon atoms which are not more than once removed. These compounds react with carbon disulfide to form the very stable cyclic-organo-trithiocarbonates containing the relatively unstrained five and six-membered heterocyclic ring structure. My process is, however, applicable to the preparation of cyclic-organo-trithiocarbonates from carbon disulfide and such compounds as contain the hydroxy or hydrolyzable groups either farther removed or on the same carbon atom. It is known, of course, that compounds containing two hydroxy groups attached to the same carbon atom are too unstable to be isolated. However, the cyclic-organo-trithiocarbonate derivatives of these compounds containing a relatively stable four-membered ring may be prepared according to the present invention by reacting carbon disulfide with the stable derivatives of these unstable alcohols. Thus, for example, methylene trithiocarbonate and homologues thereof may be prepared by utilizing methylene halide and its homologues.

Of the applicable compounds which I may react with carbon disulfide to form cyclic-organo-trithiocarbonate, those of aliphatic character, especially the lower members, are the least expensive and most available raw materials and appear to give the best yields and, therefore, may be most advantageously employed in the present process. Of these compounds, those which contain the reactive hydroxy or hydrolyzable groups attached to non-tertiary carbon atoms appear to give the best yields and the most stable products. A tertiary carbon atom is one which is attached to three other carbon atoms. Thus, for example, I may advantageously employ the glycols, such as ethylene glycol, trimethylene glycol, 2-methyl trimethylene glycol, propylene glycol, butylene glycol, butene-2 glycol, etc., the alkene oxides, such as ethylene oxide, propylene oxide, trimethylene oxide, butylene oxide, butadiene dioxide, etc., the alkene halides, such as ethylene bromide, trimethylene bromide, propylene chloride, trichlorethane, etc., the alkene halohydrins, such as ethylene chlorhydrin, trimethylene chlorhydrin, amylene chlorhydrins, etc., the glycol esters of organic acids, such as trimethylene glycol monoacetate, ethylene glycol diacetate, beta chlor ethylacetate, etc., the glycol esters of inorganic acids, such as ethylene glycol disulfate, beta chlor ethyl sulfate, etc., the glycolates, such as sodium ethylene glycolate, etc.

Thus, it is seen that, while the prior processes react carbon disulfide with a compound containing two thiol groups, I utilize compounds containing two alcoholic hydroxy groups or any of the inexpensive and available compounds, which, in the presence of water and alkali, are capable of yielding such groups. Assumnig the usual type reaction, the compounds used in the present method would be expected to react with carbon disulfide to produce derivatives of thion thiol carbonic acid. Thus, for example, by reacting ethylene glycol with carbon disulfide, one would expect ethylene thiol-thion-carbonic acid to be formed according to the equation:

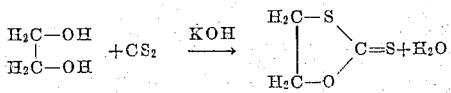

While I do not desire my invention to be limited by the soundness of any theories advanced as to the mechanisms involved, I believe that the reaction proceeds in the expected manner and that, under the reaction conditions, the thiol-thion derivatives as soon as formed, react quantitatively with the reactants present to give the desired trithiocarbonates. For example, the above ethylene-thiol-thion-carbonic acid is believed to react as follows:

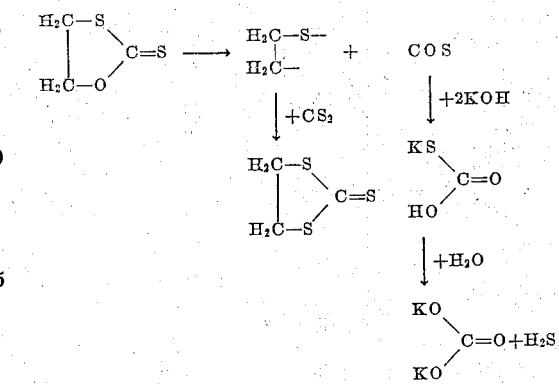

I have found that in order for the reaction to proceed, the presence of an alkali is necessary and that in order to obtain optimum yields, it is desirable that the quantity used be closely regulated. Thus, the following results were obtained when reacting ethylene chloride with carbon disulfide in the presence of varying amounts of alkali.

| Mol equiv. alkali used | Percent of theoretical yield |
|---|---|
| 8 | 0 |
| 6 | 0 |
| 4 | 86 |
| 3 | 84 |
| 2 | 77 |
| 1 | 34 |
| 0 | 0 |

I have found the optimum yields to be obtained when the quantity of alkali used is near the stoichiometric amount. The stoichiometric amount of alkali, as can be seen from the above probable reaction mechanism, is two mol equivalents per mol of organic reactant plus one mol equivalent for each hydrolyzable group in the organic reactant. Thus, for ethylene glycol the stoichiometric quantity is two mol equivalents, for ethylene chlorhydrin three mol equivalents, for ethylene chloride and trichlorethane four mol equivalents, etc.

The present process is not restricted to the use of any particular alkali. Thus, for example, any of the alkali metal hydroxides, alkaline earth oxides, metal alcoholates, alkali metal carbonates, alkali metal rhodanides, etc., may be employed. I have noticed, however, that the stronger bases, such as sodium and potassium hydroxides, appear to hasten the reaction and their use may, therefore, be preferred.

The process of the present invention is preferably executed in the presence of at least enough water to allow the hydrolysis when compounds containing hydrolyzable groups are employed. A substantial excess of water, however, although unnecessary, is in no way detrimental.

The mol ratio of carbon disulfide to organic reactant employed appears to affect the yield to some extent. I have found that, in general, somewhat better yields are obtained when this ratio is two or greater. Lower ratios, although giving somewhat lower yields, may, however, be used.

The ethylene trithiocarbonate, prepared by the present process, forms gold-colored needles melting at about 34° C. and has a remarkably high refractive index, viz. 1.79. In determining its density in water by the displacement method, I noticed that this substance, both in a crystalline and in a molten state, obstinately retained air bubbles at its surface. When poured into a glass vessel as a liquid, its meniscus was convex. In view of the remarkable properties of this compound and the excellent yield obtained, I have studied the preparation and use of cyclic-organo-trithiocarbonates in general.

In view of the tenacity with which ethylene trithiocarbonate retained air bubbles when wetted with water, the products of the present process were tested as to their efficiency as flotation agents. Preliminary tests showed cyclic-organo-trithiocarbonates, especially the lower members, to compare favorably with the best flotation agents known to the art.

The excellent activity of the cyclic-organo-trithiocarbonates as collectors in ore flotation is quite unexpected when it is considered that it has heretofore been assumed that the highest activity resulted from substances possessing a strongly polar part side by side with a non-polar part in the molecule. Thus, for example, the presence of a free salt-forming group was considered to be highly conducive to, if not essential for, a satisfactory activity. Now the present cyclic-organo-trithiocarbonates, although not possessing such a group, even surpass, for some cases, the very active alkali trithiocarbonates and the alkali xanthates in activity. Compared with these known agents, they also have the advantage of being more stable in acid media. Another advantage of the present agents over the alkali trithiocarbonates and alkali xanthates is the absence of disagreeable and evil-smelling vapors given off during the air-blowing.

Aside from the use of the present compounds as flotation collectors, these compounds, in view of their particular characteristics and low cost when prepared according to the present method, come into consideration for other applications. Thus, in view of their high sulfur content, they may find application as vulcanisation agents in the manufacture of rubber goods. These compounds also have the desirable property of being capable of dissolving large amounts of sulfur and, therefore, come into consideration as useful sulfur solvents. They may also find application, in chemical syntheses, as mediums having exceptionally high refractive index, etc.

The following examples illustrating the preparation and application of cyclic-organo-trithiocarbonates by the present method are submitted solely to aid in the understanding of the invention and are not to be construed as limitative.

*Example I*

A mixture consisting of 2 gm. mols of KOH, 1 gm. mol of $CS_2$, ½ gm. mol of ethylene chloride, and 250 cm.³ water was refluxed at 50–55° C., while stirring for about 3 hours. At the end of this time, the refluxing of the $CS_2$ being terminated, the temperature was raised to 95° C. and maintained for two hours. The resulting reaction mixture separated into two layers. The lower layer was taken up in benzene, washed with water, the greater part of the benzene removed by distillation, and the product poured into ligroin, whereupon the ethylene trithiocarbonate was precipitated in the form of yellow crystals. The yield amounted to 65 grams, which corresponds to a theoretical yield of 95%.

*Example II*

Ethylene chlorhydrin, sodium sec. decyl alcoholate, and carbon disulfide in equimolar quantities were reacted in the presence of water as in the above example. The yield of ethylene trithiocarbonate was 60% of the theoretical. It should be noted that the ratios of the reactants used in this experiment are not the optimum.

*Example III*

A mixture consisting of 2 gm. mols KOH, 1 gm. mol $CS_2$, ½ gm. mol 1,2-dichloro propane and 250 cm.³ water was reacted as in Example I. The yield of propylene trithiocarbonate was 69% of the theoretical.

*Example IV*

62 grams of CaO were slaked in 250 cm.³ water, then 76 grams of $CS_2$ and 50 grams of ethylene chloride was added while stirring and refluxing. After 2 hours the refluxing of the $CS_2$ was terminated, and the mixture was then heated during four hours at 75° C. From the resulting reaction mixture, which consisted of two layers, ethylene trithiocarbonate was recovered by extraction with benzene in a yield of about 25 grams.

*Example V*

A solution of 99 grams of KOH in 250 cm.³ water were added in drops to a solution of 40 grams of ethylene chlorhydrin in 76 grams of $CS_2$, which was cooled in an ice-salt mixture, while stirring. After some time the temperature in the reaction vessel was raised to about 55° C. and the mixture was refluxed during 2 hours, whereupon the temperature was maintained for 3 hours at 80° C. By extraction of the reaction mixture with benzene ethylene trithiocarbonate was recovered in an amount of about 35 grams.

*Example VI*

66 grams of KOH, 76 grams of $CS_2$, 22 grams of ethylene oxide and 250 cm.³ water were reacted in the same manner as described in Example V. The reaction mixture, when extracted with benzene, yielded about 20 grams of ethylene trithiocarbonate.

*Example VII*

To a solution of 7 grams of sodium in 100 cm.³ methanol 162.5 grams of glycol were added. From the resulting mixture the methanol was removed by vacuum distillation at 50° C. and then 40 grams of $CS_2$ were added in drops to the reaction product in a nitrogen atmosphere while stirring. After 5 hours' refluxing at 55° C. the mixture was heated for a further 9 hours at 95° C. By extraction of the reaction products with benzene 11 grams of ethylene trithiocarbonate were obtained.

*Example VIII*

To a mixture of 45 grams of potassium rhodanide, 45 grams of water and 30 grams of ethylene oxide, 35 grams of $CS_2$ were slowly added at −5° C. and subsequently the temperature was raised in 2 hours to 20° C. In the next 2 hours the temperature rose to 45° C. and then it rapidly increased to 105° C. Stirring was continued for another 2 hours, during which the reaction mixture cooled down to room temperature. By working up the reaction mixture, about 38 grams of ethylene trithiocarbonate were recovered. It is probable that ethylene sulfide is formed intermediately, which subsequently reacts with $CS_2$, under formation of ethylene trithiocarbonate.

*Example IX*

A copper ore containing 3.97% of sulfidic copper and 0.87% oxidic copper, was subjected to a flotation operation, whilst using per ton of ore 70 g. of ethylene trithiocarbonate as collector and a slight amount of pine oil as frothing agent. The yield based on the weight of the ore treated was 5.84% concentrate containing 46.88% sulfidic copper and 2.52% oxidic copper and 3.67% of a concentrate containing 32.00% sulfidic copper and 8.00% oxidic copper. The extraction thus amounted to about 90% total copper, viz. 98.6% sulfidic copper and 50.7% oxidic copper.

When treating the same ore whilst using xanthates as flotation agents, the copper content of the concentrates was considerably lower.

I claim as my invention:

1. A process for the production of ethylene trithiocarbonate, which comprises reacting ethylene dichloride with carbon disulfide in the presence of an alkali and water.

2. A process for the production of ethylene trithiocarbonate, which comprises reacting ethylene chlorhydrin with carbon disulfide in the presence of an alkali and water.

3. A process for the production of ethylene trithiocarbonate, which comprises reacting an ethylene halide with carbon disulfide in the presence of an alkali and water.

4. A process for the production of ethylene trithiocarbonate, which comprises reacting an ethylene halohydrin with carbon disulfide in the presence of an alkali and water.

5. A process for the production of ethylene trithiocarbonate, which comprises reacting ethylene glycol with carbon disulfide in the presence of an alkali.

6. A process for the production of alkene trithiocarbonates, which comprises reacting an alkene halide with carbon disulfide in the presence of an alkali and water.

7. A process for the production of alkene trithiocarbonates, which comprises reacting an alkene halohydrin with carbon disulfide in the presence of an alkali and water.

8. A process for the production of alkene trithiocarbonates, which comprises reacting an alkene glycol with carbon disulfide in the presence of an alkali.

9. Process for the production of cyclic-organo-trithiocarbonates, which comprises reacting an organic compound selected from the group consisting of the aliphatic diol compounds containing two non-tertiary carbinol groups, and their derivatives which are capable of yielding the corresponding diol compounds in the presence of water and alkali, with carbon disulfide in the presence of an alkali.

10. Process for the production of cyclic-organo-trithiocarbonates, which comprises reacting an organic compound selected from the group consisting of aliphatic diol compounds, and their derivatives which are capable of yielding aliphatic diol compounds in the presence of water and alkali, with carbon disulfide in the presence of an alkali.

11. Process for the production of cyclic-organo-trithiocarbonates, which comprises reacting an organic compound selected from the group consisting of the organic diol compounds wherein the carbinol groups are not more than once removed from each other, and their derivatives which are capable of yielding the corresponding diol compounds in the presence of water and alkali, with carbon disulfide in the presence of an alkali.

12. Process for the production of cyclic-organo-trithiocarbonates, which comprises reacting an organic compound selected from the group consisting of the organic diol compounds, and their derivatives which are capable of yielding diol compounds in the presence of water and alkali, with at least two mol equivalents of carbon disulfide in the presence of an alkali.

13. Process for the production of cyclic-organo-trithiocarbonates, which comprises reacting an organic compound selected from the group consisting of the organic diol compounds, and their derivatives which are capable of yielding diol compounds in the presence of water and alkali, with carbon disulfide in the presence of about the stoichiometric amount of an alkali.

14. Process for the production of cyclic-organo-trithiocarbonates, which comprises reacting an organic compound selected from the group consisting of the organic diol compounds, and their derivatives which are capable of yielding diol compounds in the presence of water and alkali, with carbon disulfide in the presence of an alkali metal hydroxide.

15. Process for the production of cyclic-organo-trithiocarbonates, which comprises reacting an organic compound selected from the group consisting of the organic diol compounds, and their derivatives which are capable of yielding diol compounds in the presence of water and alkali, with carbon disulfide in the presence of an aqueous strong base.

16. Process for the production of cyclic-organo-trithiocarbonates, which comprises reacting an organic compound selected from the group consisting of the organic diol compounds, and their derivatives which are capable of yielding diol compounds in the presence of water and alkali, with carbon disulfide in the presence of an alkali.

WILLEM COLTOF.